United States Patent
Wacker et al.

(10) Patent No.: US 6,243,532 B1
(45) Date of Patent: *Jun. 5, 2001

(54) ROTATIONAL SPEED CONTROL DEVICE FOR AN ELECTRIC MOTOR

(75) Inventors: Heinrich Wacker, Weilheim; Edwin Steiert, Wolfschlugen, both of (DE)

(73) Assignee: J. Eberspacher GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,678
(22) PCT Filed: Dec. 14, 1995
(86) PCT No.: PCT/EP95/04943
  § 371 Date: Jun. 6, 1997
  § 102(e) Date: Jun. 6, 1997
(87) PCT Pub. No.: WO96/19038
  PCT Pub. Date: Jun. 20, 1996

(30) Foreign Application Priority Data

Dec. 15, 1994 (DE) ................................. 44 44 811

(51) Int. Cl.$^7$ .................................................. H02P 5/28
(52) U.S. Cl. ..................... 388/811; 388/904; 318/587
(58) Field of Search ............................... 388/811, 904; 318/587

(56) References Cited

U.S. PATENT DOCUMENTS 3,748,564 * 7/1973 Ohba .................................... 318/587
4,866,356   9/1989 Altendorf.

* cited by examiner

*Primary Examiner*—Karen Masih
(74) *Attorney, Agent, or Firm*—McGlew and Tuttle, P.C.

(57) ABSTRACT

A speed control device for an electric motor fed by a direct voltage source, the device comprising a controlled switch by which the motor voltage is alternately switched on and off under the control of a modulated switching pulse sequence. The switching frequency is higher than the frequency corresponding to the time constant of the electric motor. The switched motor voltage is regulated to a voltage set value corresponding to a desired motor speed by influencing the modulated switching pulse sequence.

19 Claims, 1 Drawing Sheet

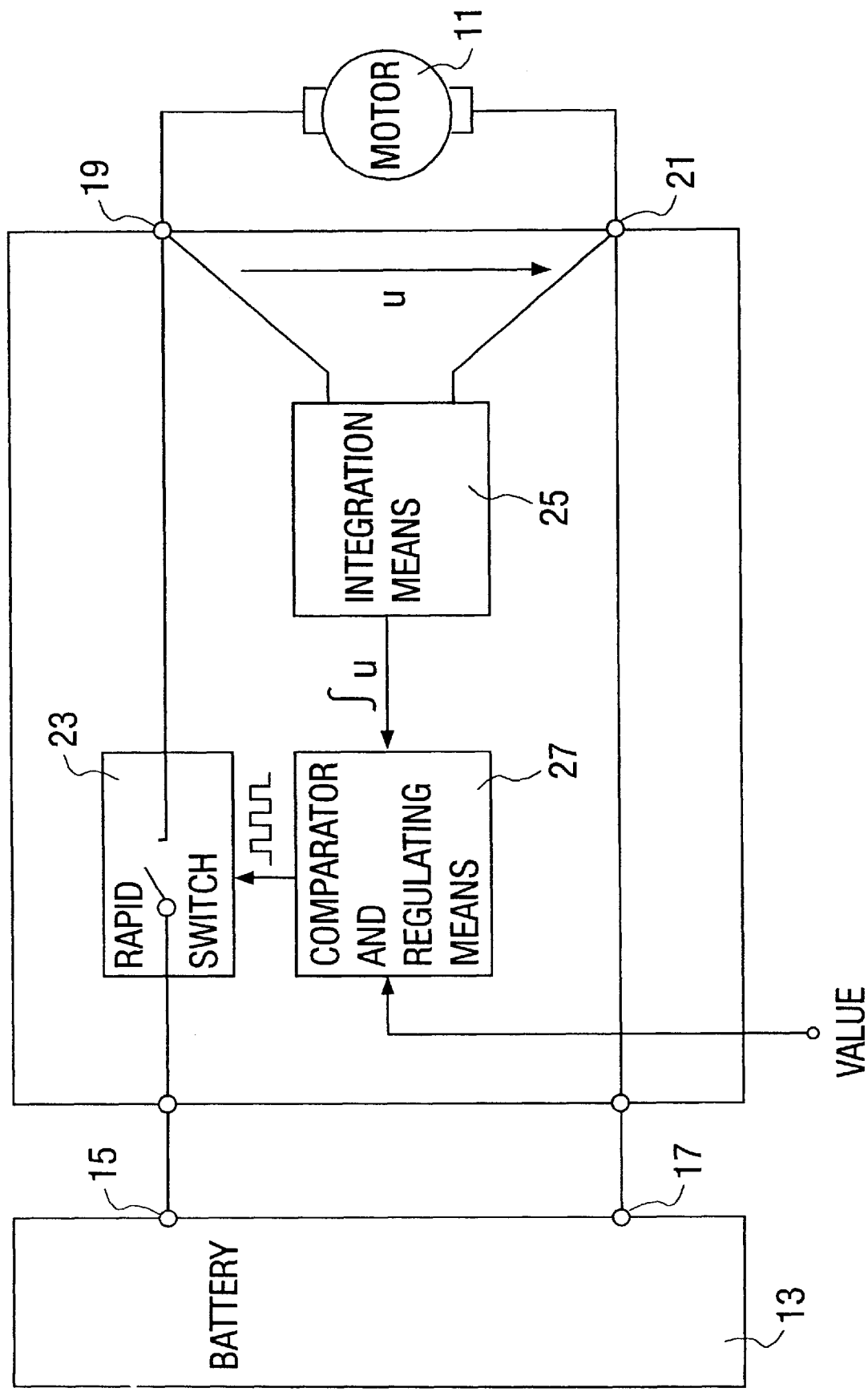

ROTATIONAL SPEED CONTROL DEVICE FOR AN ELECTRIC MOTOR

FIELD OF THE INVENTION

The invention relates to a speed control device for an electric motor fed by a direct voltage source, comprising a controlled switch means by of which the motor voltage is alternately switched on and off under the control of a modulated switching pulse sequence.

BACKGROUND OF THE INVENTION

Such a speed control device can be utilized, for example, for an additional heating apparatus of a combustion engine of a vehicle, with the combustion engine driving a blower for supplying the amount of air necessary for the fuel-air mixture. For obtaining an optimum combustion of the heater fuel, the ratio X between air and fuel of the fuel mixture should be kept constant. This means that a constant fuel amount per unit of time and a constant amount of air per unit of time have to be supplied for producing the fuel-air mixture. In order to keep constant the supplied amount of air per unit of time, the combustion engine or blower motor must be kept at a constant speed. However, this presupposes a constant battery voltage of the vehicle battery powering the additional heating apparatus of the vehicle.

In practical applications, the battery voltage of a vehicle may show relatively large fluctuations. In case of a vehicle battery having a nominal voltage of 24 V, as used for example for lorries/strucks or busses, a fluctuation width or range of the battery voltage between 18 V and 32 V is assumed. This results in a correspondingly high fluctuation of the speed of the blower motor and in a corresponding fluctuation of the amount of air supplied per unit of time for preparing the fuel-air mixture.

For obtaining a constant blower speed despite these high fluctuations in battery voltage, it is common practice to keep the speed of the blower motor at a constant set value by means of a speed regulating circuit. Such a regulating circuit necessitates a sensor disposed on the electric motor or on the blower impeller driven by the latter and serving for measuring the actual speed value. To this end, optical sensors or magnetic sensors are usually employed. Both sensor types increase the manufacturing costs and entail problems. Optical sensors are subject to the problem of soiling. Magnetic sensors are subject to the problem that they must be disposed as close as possible to a magnetic generator.

SUMMARY AND OBJECTS OF THE INVENTION

It is the object of the invention to be able, also without such sensors and with as little cost expenditure as possible, to keep constant the speed of an electric motor fed by a direct voltage source, also in case of greater fluctuations of the direct voltage. This object is met with respect to the speed control device of the type indicated at the outset in that the switching frequency is higher than the frequency corresponding to the motor time constant of the electric motor and in that the switched motor voltage is regulated to a voltage set value corresponding to a desired motor speed by influencing the modulated switching pulse sequence.

The modulation of the switching pulse sequence preferably is a pulse width modulation, but may also be a pulse frequency modulation or a pulse amplitude modulation.

The fact that the switching frequency is to be higher than the frequency corresponding to the motor time constant of the electric motor means in the present context that the motor winding inductance is not to have an effect on the switching frequency, i.e. that during the switching-off intervals of the pulse width modulated switching pulse sequence no, or virtually no, discharging of the magnetic energy is to take place that was stored in the motor winding inductance during the switching-on time.

With such a high switching clock frequency, the motor winding inductance cannot yet have an effect on the motor terminals. During the switching-off intervals of the switching pulse sequence, it is not yet possible that a generator voltage builds up that is caused by the magnetic discharge on the motor winding inductance. It is thus possible to directly measure the rectangular signal of the controlled switch. With these high switching or clock frequencies, the electric motor behaves as if a direct voltage were applied to the motor terminals that corresponds to the average value of the clocked, i.e. alternately switched on and off direct voltage. The electric motor is not subject to higher loads as if a direct voltage were applied that corresponds to this average value.

Thus, according to the invention, no speed regulation takes place, but instead a speed control with the aid of a regulated motor voltage takes place. As the speed of an electric motor is proportional to the motor voltage thereof, a regulated motor voltage has the effect of a speed regulation. One thus obtains a constant motor speed that is independent of the battery voltage.

The lengths and cross-sections of the electrical lines connecting the electric motor to the vehicle battery are at the discretion of the vehicle manufacturer and may vary from vehicle type to vehicle type. Corresponding differences are thus present in the electric resistances between the terminals of the vehicle battery and the motor terminals. Due to the fact that, in the speed control device according to the invention, the motor voltage is measured at the motor terminals, or at least very close to the motor terminals, the influence of differently dimensioned resistances of the electrical connecting lines between the vehicle battery and the electric motor is eliminated by the speed control device. In addition thereto, tolerance factors, aging etc. of the circuit components of the speed control device are compensated.

In a preferred embodiment of the speed control device according to the invention, the voltage regulation is effected with the aid of a regulating circuit having an integration means through which the clocked motor voltage is integrated for forming an average voltage serving as actual value, a comparator means comparing the actual value to a predetermined set value, and a regulating means effecting, depending on the result of the comparison, a pulse width modulation of the switching pulse sequence fed to the switch means.

The comparator means and the regulating means preferably are composed with a microprocessor to which the set value is supplied in the form of a digital signal. In this case, the integration means has an analog to digital converter associated therewith which converts the analog average voltage value formed by the integration means into a digital value.

In the speed control device according to the invention, the pulse duty factor of the switching pulses supplied to the switch means preferably is regulated such that the average voltage value of the clocked directed voltage supplied to the electric motor corresponds to the predetermined voltage set value. In case pulse frequency modulation or pulse amplitude modulation is employed, the frequency or the amplitude of the switching pulses, with constant switching-on time or pulse width, is regulated such that the electric motor is fed with a clocked direct voltage having an average voltage value corresponding to the set value.

By providing a corresponding predetermined set value, the average motor voltage may be varied continuously or in steps, depending on the operating condition of the additional heating apparatus of the vehicle. For example, it is advantageous for a soft start of the blower motor to predetermine a set value for a voltage curve increasing in ramp-like manner. It is also possible to preset a lower motor voltage and thus a lower speed during the ignition operation of the burner of the heating apparatus, since during ignition of the burner, less air is as a rule desired for the fuel-air mixture. After ignition, the amount of air delivered by the blower per unit of time may then be slowly increased by a continuously increasing the set value. It is also possible to control the heating power by correspondingly presetting the set value.

For blower motors as employed in usual additional heating apparatus of vehicles, a switching frequency is suitable as a rule that is about 20 kHz.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The sole drawing is a schematic block diagram of the present invention.

DETAILED DESCRIPTION OF THE PREFERRED EMBODIMENT

Referring to the drawing, an electric direct current motor 11 is powered by the voltage of a battery 13, and in case of a vehicle heating system by the voltage of a vehicle battery. Battery 13 has two battery poles 15 and 17 connected to two motor terminals 19 and 21. Connected in series between the connection of battery pole 15 and motor terminal 19 is a rapid electronic switch 23 which may be a switching transistor, for example. The latter is driven by means of a pulse width modulated switching pulse sequence so that the battery voltage is alternately switched on and off, with a corresponding pulse duty factor. The motor terminals 19 and 21 of the motor 11 thus are fed with a direct voltage that is clocked in accordance with this pulse duty factor. The clock or switching frequency of the voltage is, for example, in the range of about 20 kHz.

The clocked direct voltage occurring across the motor terminals 19 and 21 is fed to an integration means 25 which integrates the clocked motor direct voltage and thus generates an average value of the clocked motor direct voltage. The integration means 25 includes an analog to digital converter (not shown), so that the integrated average value of the clocked motor direct voltage is issued from the output of the integration means 25 in the form of a digital signal value. The output is fed to a first input of a comparator and regulating means 27 which receives, via a second input, a set value in the form of a digital signal. The comparator and regulating means 27 preferably includes a microprocessor. In the comparator and regulating means 27, the digital actual value from the integration means 25 and the digital set value are compared. At the output of the comparator and regulating means 27 a switching control signal for the electronic switch 23 is formed. This signal is pulse width modulated in accordance with the result of the comparison of set value and actual value. The electronic switch 23 thus switches the direct voltage from battery 13 in alternating manner on and off, with a pulse duty factor that is dependent on the result of the comparison between actual value and set value. The clocked motor direct voltage as a result thereof is given an average value corresponding to the predetermined set value.

The direct voltage effective for direct current motor 11 in this manner is regulated to a voltage value corresponding to the set value, which leads to a corresponding speed of the direct current motor 11.

With the aid of this voltage regulation, it is possible to control the motor speed to a constant value, without a sensor being necessary for detecting the motor speed.

While specific embodiments of the invention have been shown and described in detail to illustrate the application of the principles of the invention, it will be understood that the invention may be embodied otherwise without departing from such principles.

What is claimed is:

1. A speed control device for an electric motor, the device comprising:

controlled switch means for receiving a source voltage, said controlled switch means modulating said source voltage according to a switching signal, said switching signal having a frequency higher than a frequency corresponding to a time constant of the electric motor, said controlled switch means applying said modulated source voltage to the electric motor;

regulation means for regulating said modulated source voltage to a voltage set value corresponding to a desired motor speed by varying said switching signal at the frequency higher than the frequency corresponding to the time constant of the electric motor;

integration means for integrating said modulated source voltage occurring at terminals of the motor to form a motor voltage average value;

comparator means for determining a deviation between said motor voltage average value and said set value;

said regulation means varying a pulse width modulation of said switching signal dependent on said deviation, said integration means includes an analog to digital converter for converting said motor voltage average value to a digital value.

2. A device in accordance with claim 1, wherein:

said controlled switch means alternately switches said modulated source voltage on and off;

said source voltage is a direct voltage;

said switching signal is a pulse sequence.

3. A device in accordance with claim 1, wherein:

said set value is variable in program-controlled manner so as to obtain a varying motor speed.

4. A device in accordance with claim 1, wherein:

said set value is variable in one of a ramp-like and stepped manner.

5. A device in accordance with claim 1, wherein:

said switching signal frequency is approximately 20 kHz.

6. A device in accordance with claim 1, wherein:

said source voltage is uncontrollably variable.

7. A device in accordance with claim 1, wherein:

said integration means integrates substantially no EMF from the motor.

8. A method for controlling a speed of an electric motor:

providing a voltage;

modulating said voltage at a frequency higher than a time constant of the electric motor;

delivering said modulated voltage to the electric motor;

measuring said modulated voltage to form a measured value, said measuring including integrating said modulated voltage adjacent terminals of the motor to form an average modulated voltage;

varying said modulating to equalize said measured value with a set value corresponding to a desired motor speed.

9. A method in accordance with claim 8, wherein:

said modulating includes pulse width modulating.

10. A method in accordance with claim 8, wherein:

said modulating includes pulse modulating.

11. A method in accordance with claim 8, wherein:

said voltage provided before said modulating is uncontrollably variable.

12. A method in accordance with claim 8, wherein;

said measuring includes substantially no EMF from the motor.

13. The method in accordance with claim 8, wherein:

said modulating is performed at a frequency to prevent substantial measurement of magnetic discharge of motor winding inductance during said off intervals of said modulated voltage by said measuring of said modulated voltage.

14. The method in accordance with claim 8, wherein:

said modulating is performed at a frequency to prevent a substantial measurement of discharge of magnetic energy from windings of the motor during said off intervals of said modulated voltage by said measuring of said modulated voltage.

15. The method in accordance with claim 13, wherein said modulating is performed at a frequency to prevent a substantial measurement of motor generator voltage build up during said off intervals of said modulated voltage by said measuring of said modulated voltage.

16. A method for controlling a speed of an electric motor, the method comprising the steps of:

providing a voltage to terminals of the motor;

continuously measuring voltage at the terminals of the motor to form an average motor voltage;

modulating said voltage with on and off intervals, said modulating being performed to prevent a substantial motor generator voltage build up during said off intervals of said modulated voltage at the terminals of the motor;

varying said modulating to equalize said average modulated voltage with a set value corresponding to a desired motor speed.

17. The method in accordance with claim 16, wherein;

said modulating is performed at a frequency to prevent substantial measurement of magnetic discharge of motor winding inductance during said off intervals of said modulated voltage by said measuring of said voltage.

18. The method in accordance with claim 16, wherein:

said modulating is performed at a frequency to prevent substantial measurement of discharge of magnetic energy from windings of the motor during said off intervals of said modulated voltage by said measuring of said voltage.

19. The method in accordance with claim 16, wherein:

a time constant of the motor is determined;

said modulating is performed at a frequency higher than said time constant of the electric motor to prevent substantial measurement of motor EMF from occurring during off intervals of said modulated voltage by said measuring of said voltage.

* * * * *